US012663587B2

(12) United States Patent
Shah et al.

(10) Patent No.: US 12,663,587 B2
(45) Date of Patent: Jun. 23, 2026

(54) ARCHITECTURE FOR WAVELENGTH MULTIPLEXERS

(71) Applicant: Chamartin Laboratories LLC, Wilmington, DE (US)

(72) Inventors: Shreyas Y. Shah, Pasadena, CA (US); Yi Zhang, Pasadena, CA (US)

(73) Assignee: CHAMARTIN LABORATORIES LLC, Wilmington, DE (US)

( * ) Notice: Subject to any disclaimer, the term of this patent is extended or adjusted under 35 U.S.C. 154(b) by 351 days.

(21) Appl. No.: 18/067,677

(22) Filed: Dec. 16, 2022

(65) Prior Publication Data

US 2023/0228945 A1     Jul. 20, 2023

Related U.S. Application Data

(60) Provisional application No. 63/292,346, filed on Dec. 21, 2021.

(51) Int. Cl.
*G02B 6/293* (2006.01)

(52) U.S. Cl.
CPC ....... *G02B 6/2938* (2013.01); *G02B 6/29305* (2013.01)

(58) Field of Classification Search
CPC ....................................... G02B 6/29
USPC ........................................... 385/37
See application file for complete search history.

(56) References Cited

U.S. PATENT DOCUMENTS

| | | | | |
|---|---|---|---|---|
| 4,897,830 A | * | 1/1990 | Hill | H04Q 11/0001 398/91 |
| 5,673,129 A | * | 9/1997 | Mizrahi | H01S 5/0687 398/91 |
| 5,778,132 A | * | 7/1998 | Csipkes | H01S 3/06704 359/341.1 |
| 6,111,681 A | * | 8/2000 | Mizrahi | H04J 14/0305 398/1 |
| 6,215,572 B1 | * | 4/2001 | Taneda | H04J 14/02 398/95 |
| 6,249,365 B1 | * | 6/2001 | Mizrahi | G02B 6/02204 398/9 |
| 6,341,025 B1 | * | 1/2002 | Mizrahi | G02B 6/2938 398/87 |
| 6,373,621 B1 | * | 4/2002 | Large | H01S 3/302 359/341.44 |

(Continued)

FOREIGN PATENT DOCUMENTS

| | | | | |
|---|---|---|---|---|
| FR | 3025659 A1 | * | 3/2016 | H01S 5/1003 |
| GB | 2487194 A | * | 7/2012 | H04J 14/06 |
| WO | WO-2014183158 A1 | * | 11/2014 | H04L 9/0858 |

*Primary Examiner* — Kaveh C Kianni
(74) *Attorney, Agent, or Firm* — Brownstein Hyatt Farber Schreck, LLP

(57) ABSTRACT

A system including wavelength multiplexers. In some embodiments, the system includes: a first multiplexing element, having a first plurality of input waveguides, each configured to receive light at a respective wavelength of a first plurality of wavelengths; and a second multiplexing element, having a second plurality of input waveguides, each configured to receive light at a respective wavelength of a second plurality of wavelengths. A wavelength of the second plurality of wavelengths may fall between a first wavelength of the first plurality of wavelengths and a second wavelength of the first plurality of wavelengths.

11 Claims, 3 Drawing Sheets

(56) References Cited

U.S. PATENT DOCUMENTS

| | | | | |
|---|---|---|---|---|
| 6,466,346 | B1 * | 10/2002 | Mizrahi | G02B 6/4246 398/87 |
| 6,661,974 | B1 * | 12/2003 | Akiyama | H04J 14/02216 398/91 |
| 6,735,395 | B1 * | 5/2004 | Bai | H04B 10/572 398/94 |
| 6,768,844 | B2 * | 7/2004 | Murphy | G02B 6/262 385/52 |
| 6,827,265 | B2 * | 12/2004 | Knowles | G06K 7/10594 235/472.01 |
| 6,830,185 | B2 * | 12/2004 | Tsikos | G06K 7/10594 235/472.01 |
| 6,898,221 | B2 * | 5/2005 | Berger | H04B 10/564 372/20 |
| 6,937,823 | B2 * | 8/2005 | Israel | H04B 10/27 398/4 |
| 7,010,185 | B2 * | 3/2006 | Grubb | H01S 5/0265 398/91 |
| 7,042,631 | B2 * | 5/2006 | Smith | G02B 6/032 385/27 |
| 7,058,248 | B2 * | 6/2006 | Grubb | G02B 6/12004 398/91 |
| 7,193,771 | B1 * | 3/2007 | Smith | H01S 3/042 372/66 |
| 7,194,157 | B2 * | 3/2007 | Jones | G02B 6/2817 385/30 |
| 8,050,525 | B2 * | 11/2011 | Shen | H04B 10/0799 385/37 |
| 8,184,929 | B2 * | 5/2012 | Kish, Jr | H01S 5/0265 385/32 |
| 8,639,070 | B2 * | 1/2014 | Neilson | H04B 10/506 385/47 |
| 10,841,012 | B2 * | 11/2020 | Wang | H04B 10/00 |
| 11,733,582 | B2 * | 8/2023 | Qiao | H05B 1/023 385/2 |
| 2002/0131098 | A1 * | 9/2002 | Israel | H04J 14/0206 398/59 |
| 2002/0164125 | A1 * | 11/2002 | Berger | H04B 10/572 385/27 |
| 2002/0191250 | A1 * | 12/2002 | Graves | H04Q 11/0066 398/79 |
| 2004/0247233 | A1 * | 12/2004 | Grubb | G02B 6/12019 385/14 |
| 2004/0258422 | A1 * | 12/2004 | Grubb | H01S 5/0265 398/183 |
| 2005/0169640 | A1 * | 8/2005 | Grubb | G02B 6/12019 398/183 |
| 2024/0385461 | A1 * | 11/2024 | Lee | H01S 3/094069 |

* cited by examiner

ARCHITECTURE FOR WAVELENGTH MULTIPLEXERS

CROSS-REFERENCE TO RELATED APPLICATION(S)

The present application claims priority to and the benefit of U.S. Provisional Application No. 63/292,346, filed Dec. 21, 2021, entitled "INTERLEAVED EG-BASED BROAD-BAND MULTIPLEXING", the entire content of which is incorporated herein by reference.

FIELD

One or more aspects of embodiments according to the present disclosure relate to photonic integrated circuits, and more particularly to an architecture for wavelength multiplexers.

BACKGROUND

In some photonic integrated circuits, an array of lasers each generating laser light at a different respective wavelength of an array of wavelengths may be connected to one or more wavelength multiplexers, such as echelle gratings, each of the wavelength multiplexers combining the light from each of a subset of the lasers into a smaller number of waveguides.

It is with respect to this general technical environment that aspects of the present disclosure are related.

SUMMARY

According to an embodiment of the present disclosure, there is provided a system, including: a first multiplexing element, having a first plurality of input waveguides, each configured to receive light at a respective wavelength of a first plurality of wavelengths; and a second multiplexing element, having a second plurality of input waveguides, each configured to receive light at a respective wavelength of a second plurality of wavelengths, wherein a wavelength of the second plurality of wavelengths falls between a first wavelength of the first plurality of wavelengths and a second wavelength of the first plurality of wavelengths.

In some embodiments, a separation between two adjacent wavelengths of the first plurality of wavelengths is within 30% of a separation between two adjacent wavelengths of the second plurality of wavelengths.

In some embodiments, a separation between two adjacent wavelengths of the first plurality of wavelengths is within 1% of a separation between two adjacent wavelengths of the second plurality of wavelengths.

In some embodiments, the first plurality of wavelengths includes 10 wavelengths and the second plurality of wavelengths includes 10 wavelengths.

In some embodiments, the first multiplexing element and the second multiplexing element together occupy a chip area less than 3.5 square millimeters.

In some embodiments, the system further includes a first laser chip including a plurality of lasers and a second laser chip including a plurality of lasers, a first subset of the lasers of the first laser chip being connected to a first subset of the first plurality of input waveguides, and a first subset of the lasers of the second laser chip being connected to a first subset of the second plurality of input waveguides.

In some embodiments, a second subset of the lasers of the first laser chip is connected to a second subset of the second plurality of input waveguides.

In some embodiments, a second subset of the lasers of the second laser chip is connected to a second subset of the first plurality of input waveguides.

In some embodiments, the system further includes a waveguide crossing at which a waveguide connecting a laser of the plurality of lasers of the first laser chip to an input waveguide of the second plurality of input waveguides crosses a waveguide connecting a laser of the plurality of lasers of the second laser chip to an input waveguide of the first plurality of input waveguides.

In some embodiments, the first multiplexing element is an echelle grating.

In some embodiments, the echelle grating has a Rowland radius within 50% of 840 microns.

In some embodiments, the echelle grating has a grating period within 50% of 3 microns.

In some embodiments, the echelle grating has an order of 2.

In some embodiments, the echelle grating has an area within 50% of 0.9 mm$^2$.

In some embodiments, the second multiplexing element is an echelle grating.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
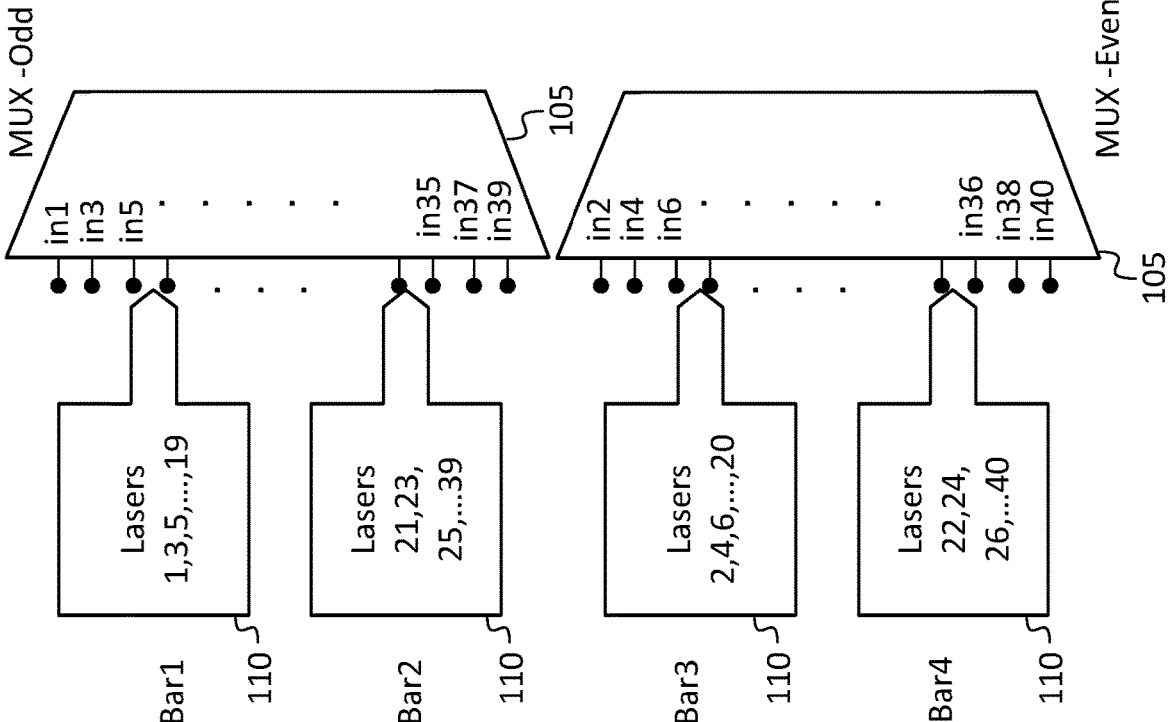
FIG. 1A is a schematic drawing of a laser system, according to an embodiment of the present disclosure.

The detailed description set forth below in connection with the appended drawings is intended as a description of exemplary embodiments of an architecture for wavelength multiplexers provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In an optical system with multiple wavelengths, it may be advantageous to combine light at a plurality of wavelengths (e.g., generated by a corresponding plurality of lasers) into a smaller number of waveguides. For example, a spectrophotometer may include one or more laser chips (e.g., III-V chips) each containing an array of waveguide coupled lasers, and the waveguides of the III-V chips may be coupled to a respective plurality of waveguides on a photonic integrated circuit. Further processing may be performed on the photonic integrated circuit; for example, the light in the plurality of waveguides may be combined into a single output waveguide by a suitable wavelength multiplexer such as an echelle grating (or an arrayed waveguide grating (AWG), or a cascade of Mach-Zehnder interferometers). The light from the single output waveguide may then be used to illuminate a sample, and the light that is transmitted through the sample may be detected by a photodetector (e.g., a photodiode). In such a system, the lasers may be turned on one at a time, so that the wavelength of the light at the output of the transmitting waveguide is swept over a wavelength range (the range of wavelengths produced by the lasers); measuring the ratio of (i) the optical power that is detected by the photodetector to (ii) the optical power emitted by the output waveguide, as a function of wavelength, may provide information about the sample (e.g., about the chemical composition of the sample).

In such a system, it may be advantageous for the photonic integrated circuit to be as compact as possible. If an echelle grating is used as the wavelength multiplexer, the size of the echelle grating may be determined in part by the wavelength spacing of the wavelengths being combined; generally, the narrower the wavelength spacing, the larger the echelle grating. The footprint of the echelle grating may be primarily represented by the Rowland radius (R) of the design, which may be determined by the spatial dispersion of the grating for the range of wavelengths required by the application. A smaller footprint (smaller R) may be made possible by (i) reducing grating pitch, thereby increasing spatial dispersion, at the expense of lower transmission across the whole bandwidth of operation, (ii) operating at higher diffraction orders, at the expense of a smaller bandwidth of operation, and higher nonuniformity in peak channel transmission across the whole bandwidth of operation, or (iii) reducing the input and output waveguide pitch while using waveguides with the same cross section, at the expense of higher crosstalk (e.g., if the waveguide pitch is sufficiently small, light may leak into neighboring waveguides, resulting in higher overall propagation loss). If the grating pitch, diffraction order, and waveguide pitch are held constant, then the Rowland radius may be inversely proportional to the minimum spacing between adjacent wavelengths, and the area occupied by the echelle grating may be inversely proportional to the square of the minimum spacing between adjacent wavelengths. As such, if the minimum spacing between adjacent wavelengths is doubled, the area occupied by the echelle grating may be reduced by a factor of four.

This increase in wavelength spacing may be accomplished, for example, by using two echelle gratings instead of one, and interleaving the wavelengths, e.g., arranging for a first echelle grating to receive every other wavelength, and for the second echelle grating to receive the remaining wavelengths. In such a design, the total area occupied by the echelle gratings may be reduced by approximately a factor of two, because a single large echelle grating will be replaced with two smaller echelle gratings, each of the two smaller echelle gratings having an area approximately one quarter of the area of the single large echelle grating. The light from the two smaller echelle gratings may be combined using, for example, a star coupler, multi-output facets, or a lens outcoupler.

FIG. 1A shows a configuration with two echelle gratings 105, fed by 40 lasers (on four III-V chips 110) generating light at 40 respective different wavelengths. In FIG. 1A the wavelengths are numbered in order of increasing wavelength, with, e.g., laser 1 producing the shortest wavelength and laser 40 producing the longest wavelength. The inputs of the two echelle gratings (labeled "MUX-Odd" and "MUX-Even" respectively) are similarly numbered 1 through 40, each input number representing the number of the wavelength that the input is configured to receive. The III-V chips are labeled "Bar1" through "Bar4". The first and third III-V chips (Bar1 and Bar3) have a gain medium suitable for the shorter wavelengths (wavelengths 1-20) and the second and fourth III-V chips (Bar2 and Bar4) have a gain medium suitable for the longer wavelengths (wavelengths 21-40). As may be seen from FIG. 1A, the first echelle grating (MUX-Odd) is configured to multiplex together the odd wavelengths, and the second echelle grating (MUX-Even) is configured to multiplex together the even wavelengths. As a result, the minimum spacing between adjacent wavelengths is approximately twice what it would be if a single echelle grating were used to multiplex together all of the wavelengths.

Figure 1B:
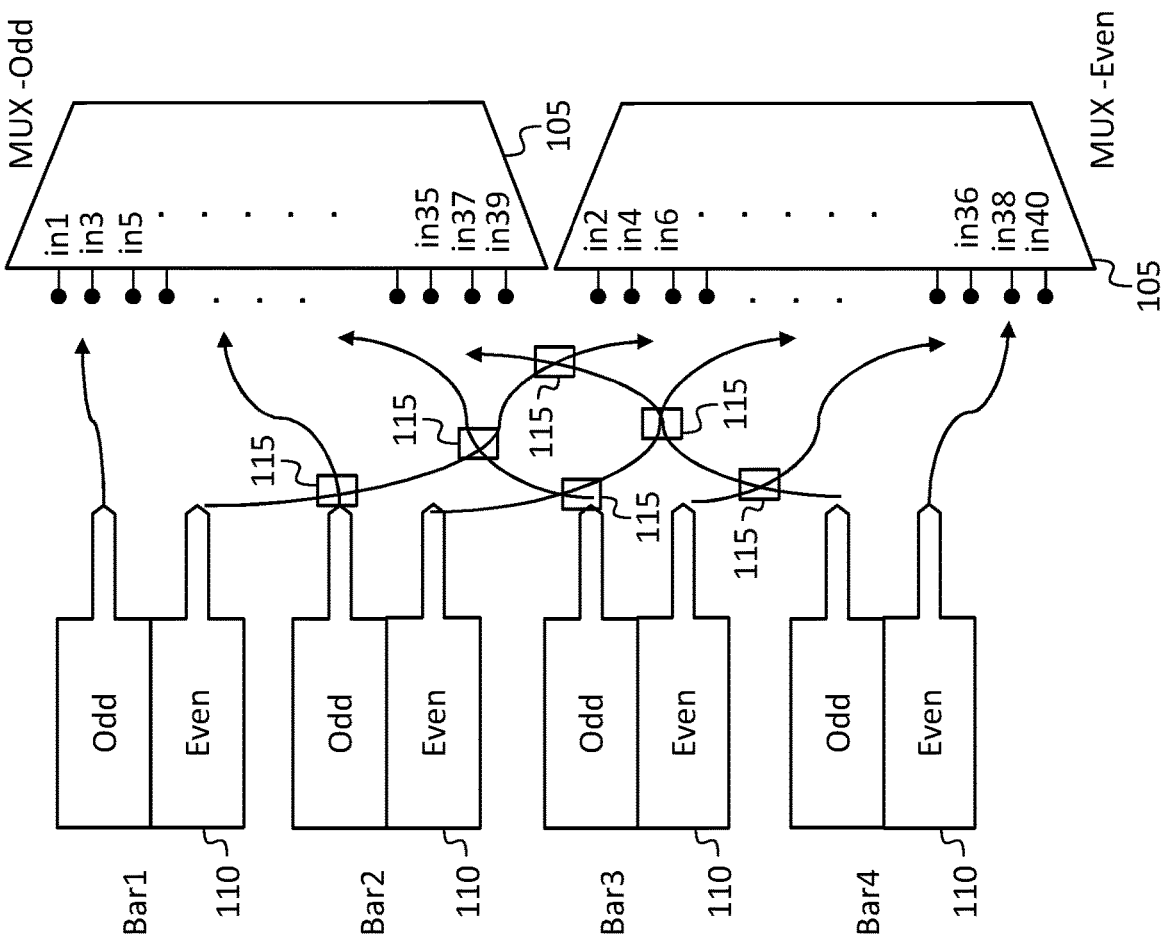
FIG. 1B is a schematic drawing of a laser system, according to an embodiment of the present disclosure.

FIG. 1B shows a configuration with the same number of III-V chips, each however containing lasers covering only one quarter of the full wavelength range. For example, the first III-V chip of FIG. 1B has lasers 1-10 (i.e., lasers generating light at wavelengths 1-10), of which the odd-numbered wavelengths are fed to the first echelle grating (MUX-Odd) and the even numbered ones are fed to the second echelle grating (MUX-Even). Waveguide crossings (e.g., waveguide crossing arrays 115) are used to allow each laser to be connected to the corresponding input of one of the echelle gratings. The reduced wavelength range supplied by each of the III-V chips may make it possible to include, on each of the III-V chips, a gain medium having a smaller bandwidth, which may be more efficient (e.g., which may require less electrical power to produce the same optical output power).

Figure 1C:
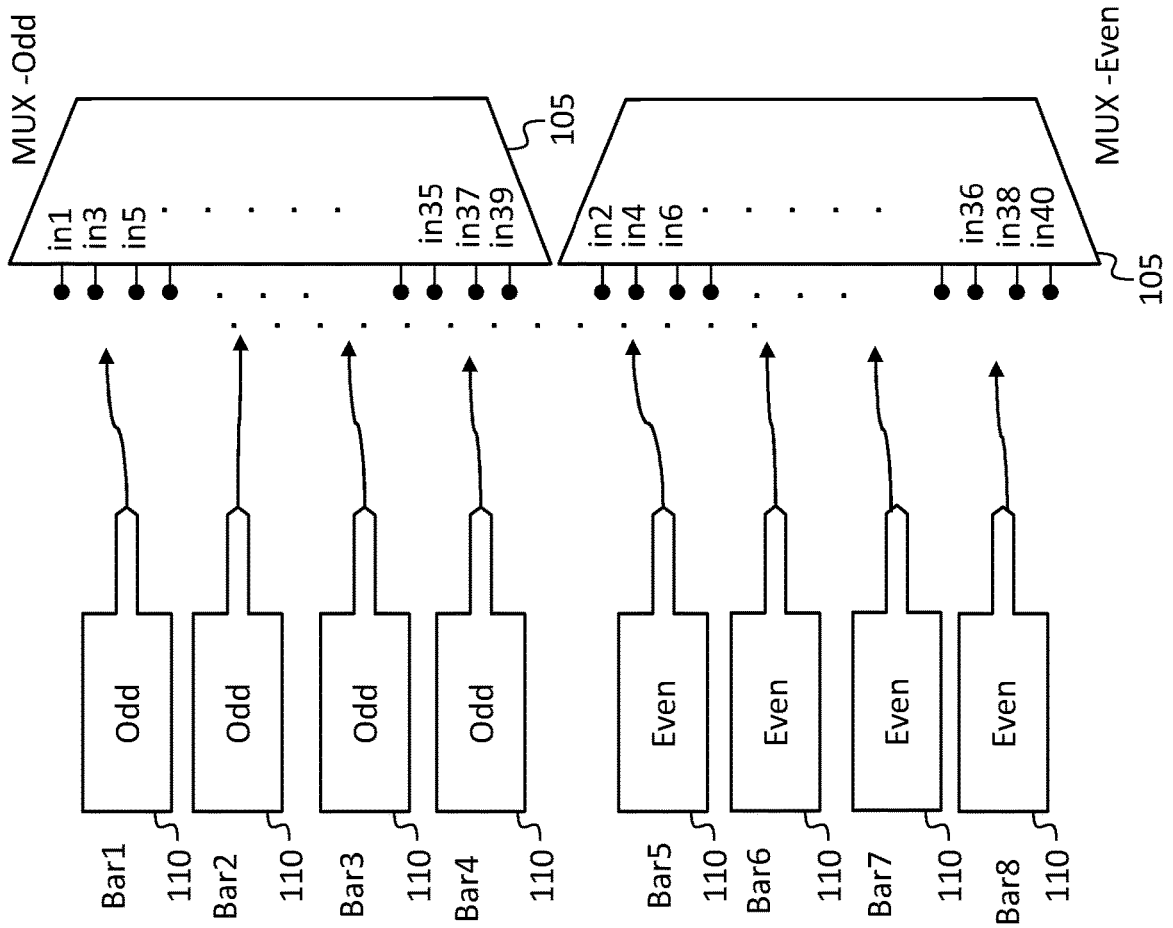
FIG. 1C is a schematic drawing of a laser system, according to an embodiment of the present disclosure.

FIG. 1C shows a configuration with eight III-V chips (twice as many as in the configurations of FIGS. 1A and 1B), and without waveguide crossings. As shown, each III-V chip covers substantially the same wavelength range as a corresponding III-V chip in the configurations of FIGS. 1A and 1B. For example, like Bar1 in FIG. 2B, in FIG. 1C Bar1 and Bar5 together cover wavelengths 1-10 (with Bar1 covering wavelengths 1-9 and Bar5 covering wavelengths 2-10). Micro-transfer printing may be employed to place the III-V chips on the photonic integrated circuit and to bond the III-V chips in place.

Each of the echelle gratings may cover a wavelength range extending from about 1.55 microns to about 1.84 microns, may use grating order 2, may have a grating period of 3 microns, may have a waveguide pitch of 3.6 microns, may have an angular position of the output waveguide on the Rowland circle of about 6 degrees, may have a Roland radius of about 840 microns, may have an area of about 0.9 mm², may exhibit a minimum loss of about 0.6 dB and may exhibit a maximum loss of about 1.2 dB. The input waveguides of each of the echelle gratings may have a width of 2.6 microns, and the minimum gap between adjacent waveguides may be 1.0 microns. In some embodiments, any of the one or more grating parameters disclosed in this paragraph may vary by +/−50% of the disclosed value. For example, each of the parameters, instead of having precisely the disclosed value, may have a value that is within 50% of the disclosed value.

In some embodiments the concept of FIGS. 1A-1C may be generalized to more than two echelle gratings. For example, three echelle gratings may be used, and e.g., wavelengths 1, 4, 7, . . . may be routed to the first echelle grating, wavelengths 2, 5, 8, . . . may be routed to the second echelle grating, and wavelengths 3, 6, 9, . . . may be routed to the third echelle grating. Similarly, more than three echelle gratings may be used (e.g., 4, 5, 6, 7, or 8 echelle gratings) with the minimum spacing between adjacent wavelengths being increased accordingly.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, a "subset" of a set is either (i) the entire set or (ii) a proper subset of the set. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., $(1−{}^{35}/_{100})$ times 10) and the recited maximum value of 13.5 (i.e., $(1+{}^{35}/_{100})$ times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of an architecture for wavelength multiplexers have been specifically described and illustrated herein, many modifications and variations will be apparent to those skilled in the art. Accordingly, it is to be understood that an architecture for wavelength multiplexers constructed according to principles of this disclosure may be embodied other than as specifically described herein. The invention is also defined in the following claims, and equivalents thereof.

What is claimed is:

1. A system, comprising:
a first multiplexing element, having a first plurality of input waveguides, each configured to receive light at a respective wavelength of a first plurality of wavelengths;
a second multiplexing element, having a second plurality of input waveguides, each configured to receive light at a respective wavelength of a second plurality of wavelengths;
a first laser chip comprising a first plurality of lasers configured to emit a first subset of the first plurality of wavelengths;
a second laser chip comprising a second plurality of lasers configured to emit a second subset of the second plurality of wavelengths; and
a third laser chip comprising a third plurality of lasers configured to emit a first a first subset of the second plurality of wavelengths,
wherein;
a wavelength of the second plurality of wavelengths falls between a first wavelength of the first plurality of wavelengths and a second wavelength of the first plurality of wavelengths; and
the first subset of the second plurality of wavelengths falls between the first subset of the first plurality of wavelengths and the second subset of the first plurality of wavelengths.

2. The system of claim 1, wherein a separation between two adjacent wavelengths of the first plurality of wavelengths is within 30% of a separation between two adjacent wavelengths of the second plurality of wavelengths.

3. The system of claim 1, wherein a separation between two adjacent wavelengths of the first plurality of wavelengths is within 1% of a separation between two adjacent wavelengths of the second plurality of wavelengths.

4. The system of claim 1, wherein the first plurality of wavelengths comprises 10 wavelengths and the second plurality of wavelengths comprises 10 wavelengths.

5. The system of claim 1, wherein the first multiplexing element and the second multiplexing element together occupy a chip area less than 3.5 square millimeters.

6. The system of claim 1, wherein the first multiplexing element is an echelle grating.

7. The system of claim 6, wherein the echelle grating has a Rowland radius within 50% of 840 microns.

8. The system of claim 6, wherein the echelle grating has a grating period within 50% of 3 microns.

9. The system of claim 6, wherein the echelle grating has an order of 2.

10. The system of claim 6, wherein the echelle grating has an area within 50% of 0.9 mm$^2$.

11. The system of claim 6, wherein the second multiplexing element is an echelle grating.

* * * * *